(12) United States Patent
John et al.

(10) Patent No.: US 7,685,644 B2
(45) Date of Patent: Mar. 23, 2010

(54) MANAGING USER ACCESS TO DATA

(75) Inventors: Peter John, Heidelberg (DE); Christian Muenkel, Schriesheim (DE)

(73) Assignee: SAP AG, Walldorf (DE)

( * ) Notice: Subject to any disclaimer, the term of this patent is extended or adjusted under 35 U.S.C. 154(b) by 971 days.

(21) Appl. No.: 10/943,710

(22) Filed: Sep. 17, 2004

(65) Prior Publication Data

US 2005/0257066 A1 Nov. 17, 2005

Related U.S. Application Data

(60) Provisional application No. 60/570,773, filed on May 13, 2004, provisional application No. 60/572,207, filed on May 17, 2004.

(51) Int. Cl.
*G06F 17/00* (2006.01)
(52) U.S. Cl. .............................. 726/27; 726/28; 726/30; 707/9
(58) Field of Classification Search .................. 726/28, 726/2, 26, 27, 30; 713/182; 707/9
See application file for complete search history.

(56) References Cited

U.S. PATENT DOCUMENTS

| 6,789,195 | B1 * | 9/2004 | Prihoda et al. | 713/182 |
| 2005/0076030 | A1 * | 4/2005 | Hada et al. | 707/9 |

OTHER PUBLICATIONS

Sandu et al., Access Control: Principles and Practice, Sep. 1994, IEEE Communications Magazine, pp. 40-48.*
"SAP System Administration: Authorization Concepts" downloaded from http://www.geocities.coin/SiliconValley/Grid/4858/sap/Basis/AuthIntro.htm on Sep. 16, 2004, 2 pages.
"A Pragmatic Approach to Conceptual Modeling of OLAP Security" by Priebe et al., Proc. 20th International Conference on Conceptual Modeling (ER 2001), Nov. 27-30, 2001, 14 pages.
"Towards OLAP Security Design—Survey and Research Issues" by Priebe et al., Pro. Third ACM International Workshop on Data Warehousing an OLAP (DOLAP 2000), Nov. 10, 2000, pp. 33-40.

* cited by examiner

*Primary Examiner*—Kimyen Vu
*Assistant Examiner*—Edward Zee
(74) *Attorney, Agent, or Firm*—Mintz, Levin, Cohn, Ferris, Glovsky and Popeo, P.C.

(57) ABSTRACT

A method of managing user access to data includes detecting that a user seeks access to a data portion that belongs to a specified category. One or more authorizations are evaluated, each authorization having an authorization segment corresponding to the specified category. The method includes permitting the sought access to the data portion if at least one of the authorization segments corresponding to the specified category identifies the data portion to which access is sought. The method may permit access to data that falls within a union of granted authorizations. An authorization segment may correspond to a data dimension or to a meta dimension, such as an authorized action or data source, that does not directly relate to a data dimension.

26 Claims, 5 Drawing Sheets

MANAGING USER ACCESS TO DATA

CROSS-REFERENCE TO RELATED APPLICATION

This application claims the benefit of U.S. Provisional Patent Application Ser. No. 60/570,773, filed on May 13, 2004 and of U.S. Provisional Patent Application Ser. No. 60/572,207, filed on May 17, 2004. The contents of each application are incorporated by reference into this document.

TECHNICAL FIELD

This description relates to managing user access to data in a computer system.

BACKGROUND

Many computer systems are configured to prohibit access to data unless the user has a sufficient authorization. Such authorizations for one or more users may be stored in the computer system and may be consulted upon a user seeking access to specific data. Depending on the kind of data stored in the system and on other factors, it may be desirable to issue more than one authorization for a user.

An example of an existing system that manages user authorizations is a computer system available from SAP AG in Walldorf (Baden), Germany, such as a Business Information (BI) Warehouse system or a Customer Relationship Management (CRM) system. Such systems use "authorization objects" that can be configured by filling in up to ten authorization fields per user. The authorization objects are evaluated serially and if a first authorization object does not permit access to the sought data, the system does not evaluate the remaining authorization object(s). Moreover, a condition for granting access is that the sought data falls within all evaluated authorization objects, that is, within the intersection of the authorization objects.

SUMMARY

The invention relates to managing user access to data in a computer system.

In a first aspect, a method comprises detecting that a user seeks access to a data portion that belongs to a specified category. One or more authorizations are evaluated, each authorization having an authorization segment corresponding to the specified category. The sought access to the data portion is permitted if at least one of the authorization segments corresponding to the specified category identifies the data portion to which access is sought.

In selected embodiments, at least one authorization segment specifies a validity of the authorization. The validity may comprise a periodically granted access permission.

In selected embodiments, the specified category to which the data portion belongs is a measure dimension. The data portion may be at least one selected from the group consisting of: revenue, discount, net revenue, production costs, and combinations thereof.

In selected embodiments, at least one authorization segment corresponds to a meta dimension that does not directly correspond to a data dimension. The meta dimension may correspond to authorizing the user to access a data source. The meta dimension may correspond to authorizing the user to perform an action.

In selected embodiments, user access to a portion of a hierarchy can be granted. A structure of the hierarchy may In a second aspect, a method comprises detecting that a user seeks access to data that belongs to at least first and second specified categories. One or more authorizations are evaluated, each authorization having at least one authorization segment corresponding to one of the first and second specified categories. The sought access to the data is permitted if the authorization segments in the one or more authorizations 1) correspond to the first and second specified categories and 2) identify the data to which access is sought.

Advantages of the system and techniques described herein may include any or all of the following. Providing improved authorization management; providing authorizations such that access is granted if the sought data falls within a union of the granted authorizations; providing a generic approach to authorization management; providing authorization management in which an essentially unlimited number of authorizations can be granted for a user; providing authorization management in which each authorization, or a segment thereof, can be identified by a name of essentially unlimited length; providing improved authorization validity management; providing improved protection of a hierarchy structure in authorization management; providing improved role hierarchy management; and providing improved flexibility and usability in authorizations.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
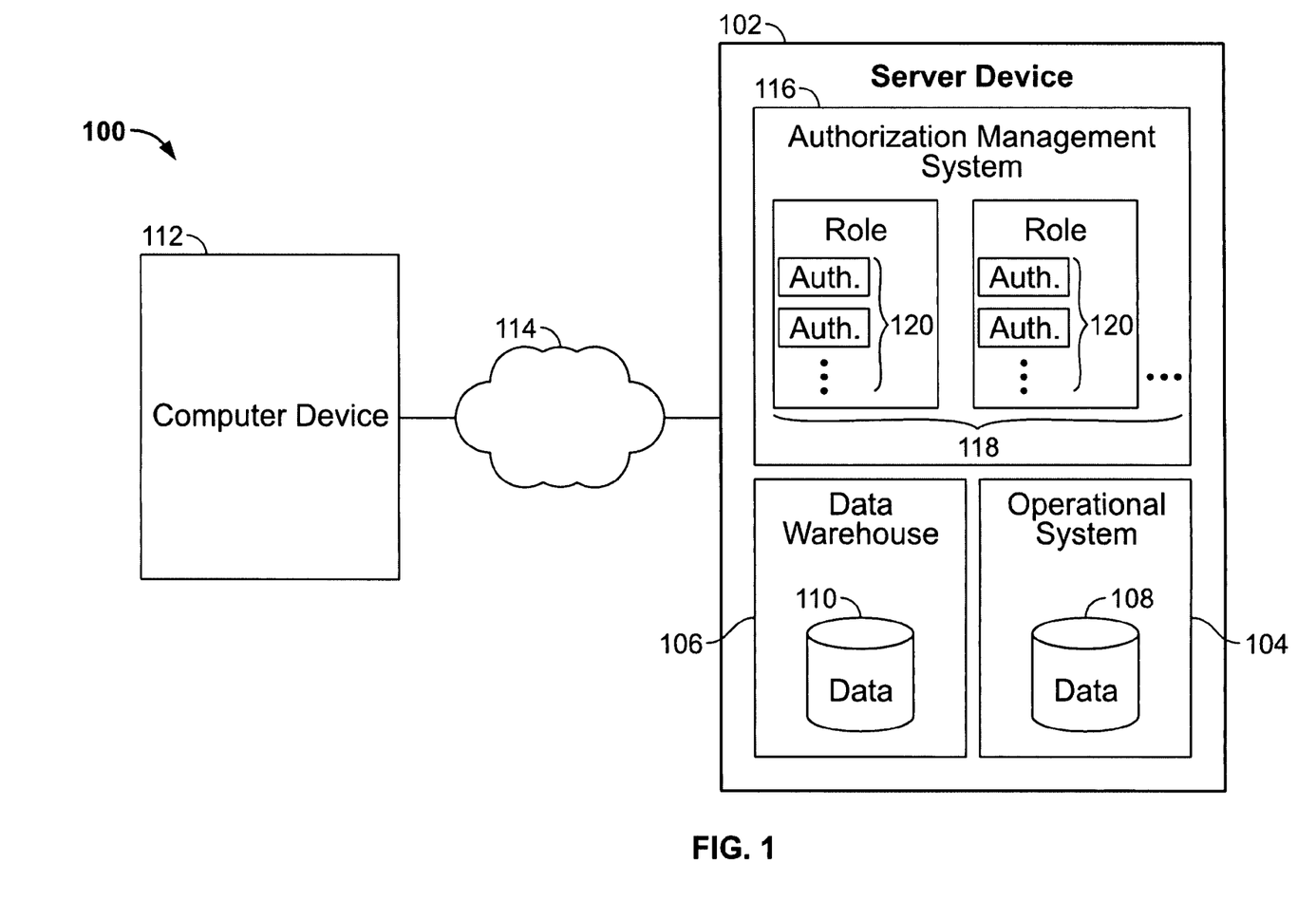
FIG. 1 is a block diagram of a system using authorizations for access to data.

Figure shows a computer system 100 that can grant access to protected data based on one or more authorizations. The system includes a server device 102 that includes an operational system 104 and a data warehouse 106. The system 104 may store operational data in a repository 108. The data warehouse, which for example retrieves data from the system 104 for reporting and other purposes, may store data in a repository 110. For example, the systems 104 and 106 may include an SAP CRM system and an SAP BI system, respectively.

Users may seek access to data stored in either or both of the repositories 108 and 110, for example using a computer device 112 that is connected to the server device through a network 114. Such access will be permitted without further if the server device is configured to give unlimited access to the data. Otherwise, the server device may prompt an authorization management system (AMS) 116 to determine if the user has sufficient authority to access the sought data. The AMS may be stored on the server device (as shown) or on another device. In some implementations, the AMS can be included in wither or both of the system 104 and 106.

The AMS 116 may include one or more roles 118. Each of the roles may include one or more authorizations 120. Each of the authorizations regulates some aspect of permitting user access to data in the server device 102. For example, when the system is configured such that data can be categorized as belonging to one or more of several categories, the authorizations may include authorization segments that correspond to respective categories. Thus, the system may grant a user access to a sought data portion if the user's authorization includes an authorization segment that identifies the sought data portion.

The data that a user seeks access to can be categorized as belonging to one or more categories (or "dimensions"). As will be described later, such dimensions may correspond to a particular aspect of the data, such as revenue or customer records, or to an aspect that does not directly correspond to the data, such as the storage location for the data or the particular action the user wants to perform, such as a read or write action.

The following are five examples of granting and evaluating authorizations. For clarity, the first four examples will use fictional authorization segments called "Flower" and "Color," respectively, which represent the real dimensions.

Example 1

A User has Authorization 1 and Authorization 2 as Follows

TABLE 1

| Authorization Segment | Authorization 1 | Authorization 2 |
|---|---|---|
| Flower | Tulip | Rose |
| Color | Red | Blue |

Table 1 shows that the Authorization 1 contains a value "Tulip" in the Flower segment and a value "Red" in the Color segment. The Authorization 2 contains a value "Rose" in the Flower segment and a value "Blue" in the Color segment. In this example, the user seeks access to a data portion that is categorized as a red tulip. The AMS 116 will determine what role, if any, is assigned to the user and what authorization(s) that role has associated with it. Upon finding that the authorizations shown in Table 1 are assigned to the user the system may evaluate them serially. That is, the AMS may begin with Authorization 1 and check whether any of its authorization segments identify the sought data portion. Here, the Flower segment, which identifies Tulip, matches the sought data portion and so does the Color segment, which identifies Red. Accordingly, the system permits the sought access to the data portion. Similarly, the system would have permitted access if the data portion had been categorized as a blue rose, because the two authorization segments of Authorization 2 identify that data portion. In an implementation with serial authorization evaluation, the AMS may evaluate Authorization 2 upon determining that the Authorization 1 does not authorize access to the blue rose data portion. Accordingly, the system permits the sought access if at least one of the authorization segments in Authorizations 1 and 2 identifies the data portion to which access is sought.

In contrast, the AMS would deny access if the user had sought access to a data portion categorized as a red rose or a blue tulip, because neither of these category combinations is covered by the Authorizations 1 and 2.

Example 2

A User has Authorization 3 and Authorization 4 as Follows

TABLE 2

| Authorization Segment | Authorization 3 | Authorization 4 |
|---|---|---|
| Flower | Tulip, Rose | Tulip |
| Color | Blue | Red, Blue, Green |

The Authorization 3 contains alternative entries in the Flower segment (Tulip and Rose) and the Authorization 4 contains alternative entries in the Color segment (Red, Blue and Green). In this example, the user seeks access to a data portion that is categorized as a red tulip. If the AMS evaluates the authorizations in Table 2 serially, it may begin by determining that Authorization 3 does not authorize access to that data portion. Thereafter, the AMS may determine that the Authorization 4 permits the sought access, because red tulip is one of the combinations covered by that authorization. Thus, the access is permitted because the sought data falls within a union of the granted authorizations.

Example 3

A User has Authorization 5 and Authorization 6 as Follows

TABLE 3

| Authorization Segment | Authorization 5 | Authorization 6 |
|---|---|---|
| Flower | Tulip | Tulip |
| Color | Red | Blue |

Here, the Authorizations 5 and 6 both contain Tulip in the Flower segment, and have different entries (Red and Blue, respectively) in the Color segment. The Authorization 5 permits access to a red tulip and the Authorization 6 to a blue tulip. If the user seeks access to blue tulip and if the authorizations are evaluated serially, evaluating the Authorization 5 will match the Flower segment but not the Color segment. Upon evaluating Authorization 6 thereafter, both the Flower segment and the Color segment will identify the sought data portion. Thus, the sought access can be permitted also if a first evaluated authorization covers some, but not every, dimension of the data portion, if there is a complete match in a subsequently evaluated authorization. One reason to have the separate authorizations 5 and 6, as opposed to a single authorization with an alternative entry (Red, Blue) in the Color segment, is that the separate authorizations may be provided with different validities.

Example 4

A User has Authorization 7A and Authorization 7B as Follows

TABLE 4

| Authorization Segment | Authorization 7A | Authorization 7B |
|---|---|---|
| Flower | Tulip | Rose |
| Color | Red | Blue |

In this example, another user has Authorization 8A and Authorization 8B as follows:

TABLE 5

| Authorization Segment | Authorization 8A | Authorization 8B |
|---|---|---|
| Flower | Tulip, Rose | — |
| Color | — | Red, Blue |

Here, the user with the Table 4 authorizations has a narrower scope of authorization than does the user with the Table 5 authorization. The Authorizations 7A and 7B permit access to red tulip and to blue rose, but do not permit access to a blue tulip, for example. The Authorizations 8A and 8B, in contrast, grant access also to the blue tulip because they cover red or blue tulips as well as red or blue roses. Thus, the Table 5 user may be granted access upon determining that the sought data portion is identified by an authorization segment in a first authorization (e.g., the entry Tulip in the Flower segment) and that the data portion is identified by an authorization segment in a second authorization (e.g., the entry Blue in the Color segment).

Example 5

A User has Authorization 9 and Authorization 10 as Follows

TABLE 6

| Authorization Segment | Authorization 9 | Authorization 10 |
|---|---|---|
| Key Figure | Revenue | Production Costs |
| Year | 1999 | 2000 |

The authorizations in Table 6 include an authorization segment "Key Figure," which is an example of a meta dimension that does not directly correspond to a (single) data dimension. That is, key figures such as revenue and production costs may be aggregates of values from several data dimensions. For example, key figures may be calculated in the data warehouse system 106 based on one or more dimensions of data obtained from the operational system 104. In this example, the user with Authorizations 9 and 10 is allowed to access the revenue data for the year 1999 and the production costs for the year 2000. In contrast, the user is not permitted to access the revenue for the year 2000 or the production costs for the year 1999.

Figure 2:
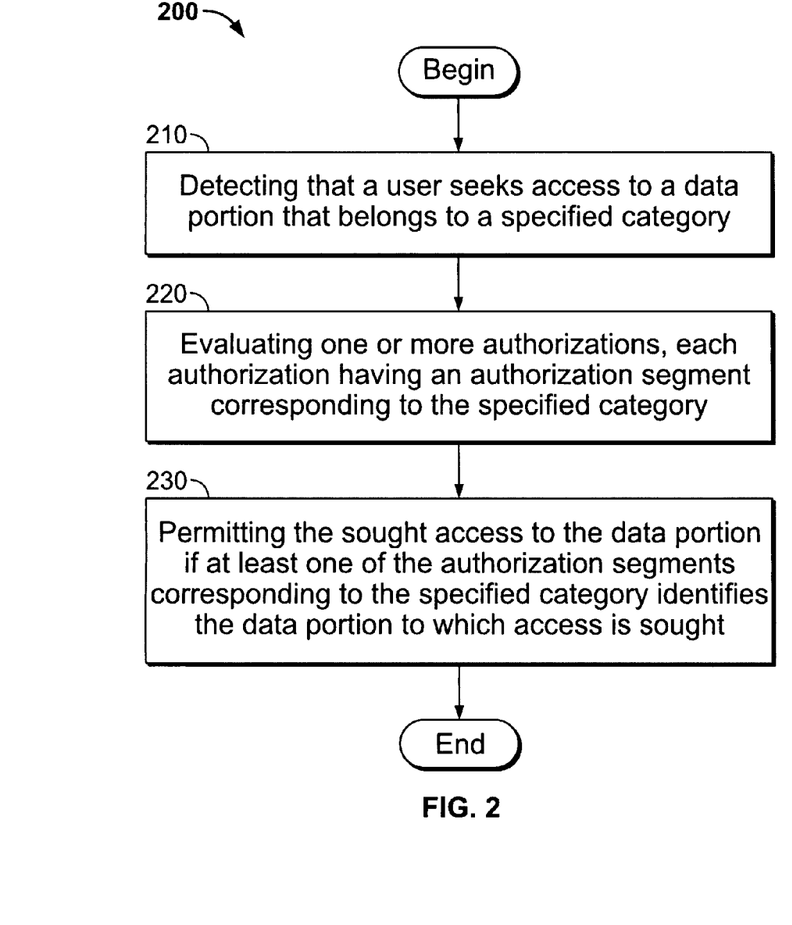
FIGS. 2 and 3 are flow charts of embodiments of inventive methods.

FIG. 2 is a flow chart of a method 200 according to an embodiment of the invention. For example, a computer program product can include instructions that cause a processor to perform the steps of the method 200. The method includes the following steps:

Detecting, in step 210, that a user seeks access to a data portion that belongs to a specified category. For example, the user may seek access, using the computer device 112, to data in either or both of the repositories 108 and 110. For example, the data may belong to the category "Revenue" shown in Example 5 above.

Evaluating, in step 220, one or more authorizations, each authorization having an authorization segment corresponding to the specified category. For example, one of the authorizations 120 shown in FIG. 1 may include a Key Figure authorization segment. Authorizations may be evaluated serially beginning with a pre-selected authorization and continuing until the sufficient authority has been found or until no more authorizations remain.

Permitting, in step 230, the sought access to the data portion if at least one of the authorization segments corresponding to the specified category identifies the data portion to which access is sought. For example, if at least one authorization segment in the authorizations 120 identifies the sought revenue data, the sought access is granted. In example 5, access to the revenue data for 1999 is granted upon determining that the authorization segments of Authorization 9 identify this data portion.

Figure 3:
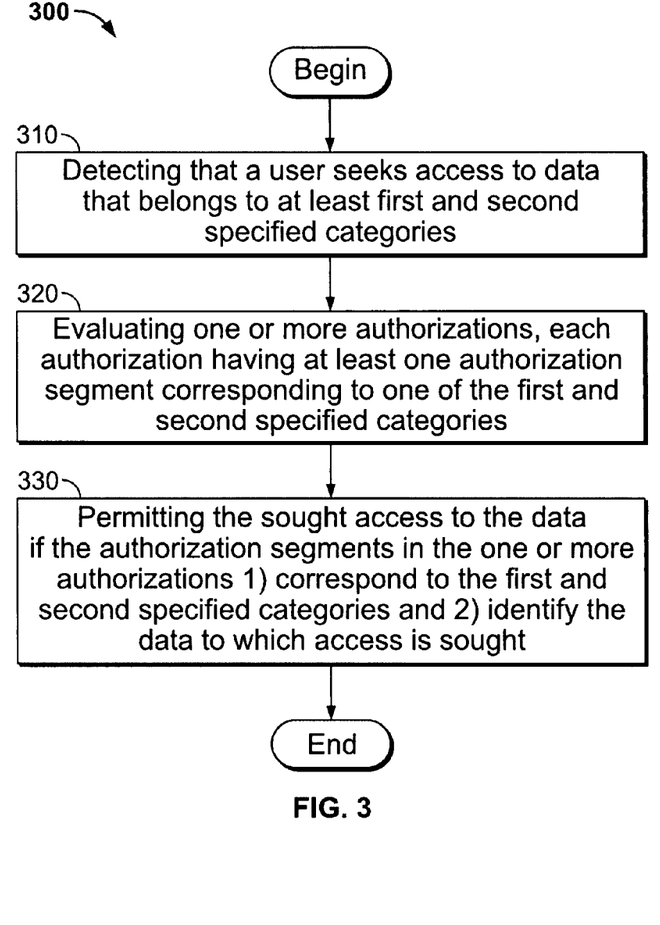

FIG. 3 is a flow chart of a method 300 according to another embodiment of the invention. For example, a computer program product can include instructions that cause a processor to perform the steps of the method 300. The method includes the following steps:

Detecting, in step 310, that a user seeks access to data that belongs to at least first and second specified categories. For example, the data may belong to categories corresponding to the fictional Flower and Color segments in Example 4 above.

Evaluating, in step 320, one or more authorizations, each authorization having at least one authorization segment corresponding to one of the first and second specified categories. For example, two of the authorizations 120 may include authorizations corresponding to the fictional Authorizations 8A and 8B in Example 4 above.

Permitting, in step 330, the sought access to the data if the authorization segments in the one or more authorizations 1) correspond to the first and second specified categories and 2) identify the data to which access is sought. For example, access to data belonging to the two categories may be granted if unconditional authorization to one of them is found in a first authorization (compare the flower Tulip in Authorization 8A) and unconditional authorization to the other is found in a second authorization (compare the color Blue in Authorization 8B).

In Example 5 above, the values for the Key Figure segment are the respective names (Revenue and Production Costs) of key figure dimensions and the values for the Year segment are the respective years 1999 and 2000. Each of these is considered a single value for its authorization segment. Authorization segments can include many different values, including any or all of the following examples:

Intervals, which can be closed (that is, [A,B] means A and B and everything in between) or open (that is, (A,B] means B and everything between A and B, but not A). For example, a segment corresponding to customer data may have the value interval [Miller,Nolan], which authorizes the user to the data for customers with a name in the range from Miller to Nolan.

Patterns, which can include operator symbols such as "*" and "+", wherein the former may represent any number of characters (including no character), and the latter may represent a single character. For example, a segment corresponding to customer data may have the value Jo*, which authorizes the user to the data for customers with names beginning with "Jo".

Variables, which may include a selectable name. The variable is provided with a value when the authorization is to be evaluated. This may take place using customizing software, for example a so-called customer exit.

Hierarchies, which can include all or part of a hierarchy such as an organization structure or a product family. For example, a hierarchy value can indicate that the user is granted access down to a certain hierarchy depth. The value may be entered as a variable. A hierarchy structure may be protected when a user is granted access to less than a whole hierarchy, as will be described below.

The data to which the authorizations relate may be categorized in one or more different dimensions. For example, there may be many different data dimensions, each corresponding to a particular aspect of data, such as the Year segment in Example 5 above. Moreover, authorizations may use segments for one or more meta dimensions that do not directly correspond to data. For example, a meta dimension may be the key figure dimension described above. The key figure dimension may include values such as revenue, discount, net revenue, production costs and other such measures, including combinations of the mentioned values.

A meta dimension may relate to authorizing the user to perform an action. Examples of actions include a display action, a change action, an update action, a read action, a write action, a revise action, and combinations thereof. For example, if a Key Figure segment covers revenue and the value in an Action segment is "Display," the user can access the revenue data for display (on the computer device 112), but will not be allowed to modify the revenue data.

A meta dimension may correspond to authorizing the user to access the data on a particular data source. For example, a certain value in this dimension may permit the user to read some data in the data warehouse system 106, but not in the operational system 104.

A meta dimension may specify a validity of the authorization. For example, values in this dimension may correspond to granting an access permission periodically, such as during the ten first days of every month, for a limited time or indefinitely.

The following is an example of a four-dimensional authorization:

TABLE 7

| Authorization Segment | Authorization 11 |
|---|---|
| Customer | Miller |
| Material | Book, TV |
| Activity | Read |
| Data Source | Repository 110 |

Table 7 shows that Authorization 11 grants the user access to read a data portion for the customer Miller that relates to a book or a TV if the data is stored in the data repository 110.

The AMS 116 may handle an essentially arbitrary number of the authorizations 120, and any number of them can be assigned to a user, for example by including them in one of the roles 118. Also, each of the authorizations can include an essentially unlimited number of authorization segments. In addition, each of the segments can be assigned a name of arbitrarily many characters, which allows for a great number of different segments without confusing names. These features provide flexible and easily extensible authorization management.

Figure 4A:
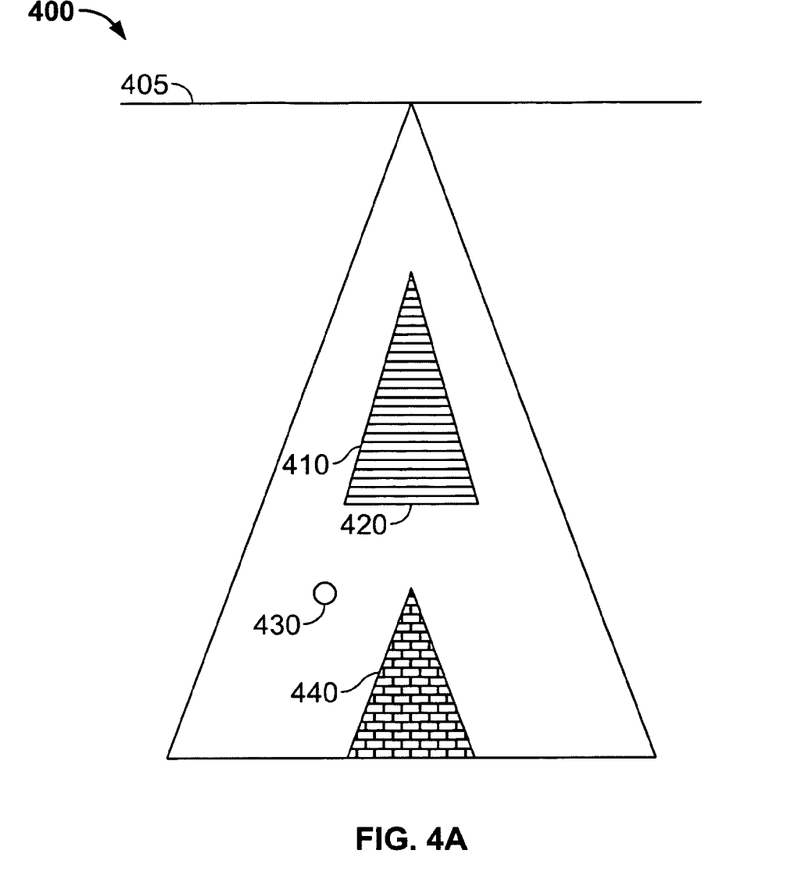
FIGS. 4A and 4B conceptually illustrate protecting a hierarchy structure when granting access according to an authorization.

When granting access to less than an entire data hierarchy, the system may protect the hierarchy structure such that the user cannot determine the place in the structure where access is granted, or even the existence of the "rest" of the hierarchy. FIG. 4A conceptually shows an example of a data hierarchy 400 such as an organization's employee hierarchy or a cost center hierarchy. A base line 405 schematically illustrates the top node from which the "depth" of a particular hierarchy level may be measured. Accordingly, an unlimited user may begin at the top and navigate through any record(s) in the hierarchy at will. A more limited user, in contrast, may be restricted to accessing less than the whole hierarchy, for example several disjunctive parts.

Here, the limited user is authorized to access the contents of a hierarchy 410, which is a subhierarchy of the hierarchy 400, but only down to a specific hierarchy level 420 where the subhierarchy 410 is truncated. Moreover, the user is authorized to access a single value 430 (conceptually shown as a black dot), and another subhierarchy 440. Here, the single value 430 and the other subhierarchy 440 are part of child branches to the subhierarchy 410, but those child branches are not covered by the authorization to the subhierarchy 410 because they are located below the specific hierarchy level 420.

Figure 4B:
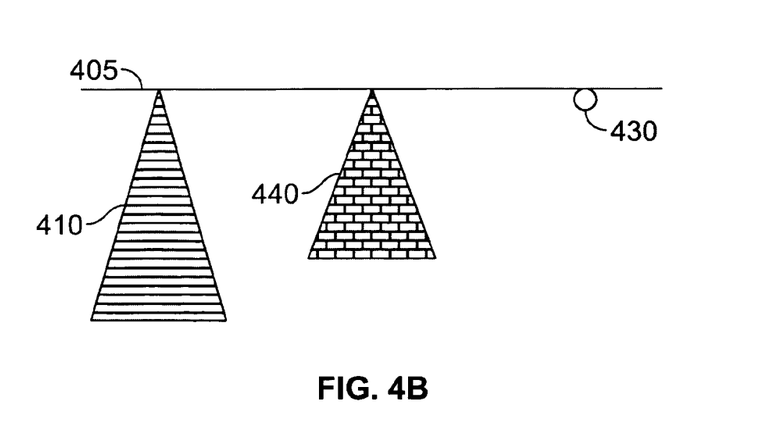

If the user were allowed to access the hierarchies 410 and 440 and the value 430 in their locations shown in FIG. 4A, the user may be able to infer certain information about the rest of the hierarchy 400 which the user is prevented from accessing. Therefore, these portions may be made available to the user while protecting the hierarchy structure as shown in FIG. 4B. Here, each of the hierarchies 410 and 440 and the value 430 are made available at the base line 405. For example, the system hides from the user the information about where in the hierarchy 400 the respective portions belong. Accordingly, the user can navigate anywhere in the hierarchy 410 without knowing that most of a remainder thereof (its child branches) are off limits, and without knowing that the hierarchy 400 exists. Similarly, the user can access the hierarchy 440 and the value 430 without knowing that they are part of the child branches of the hierarchy 410.

Figure 5:
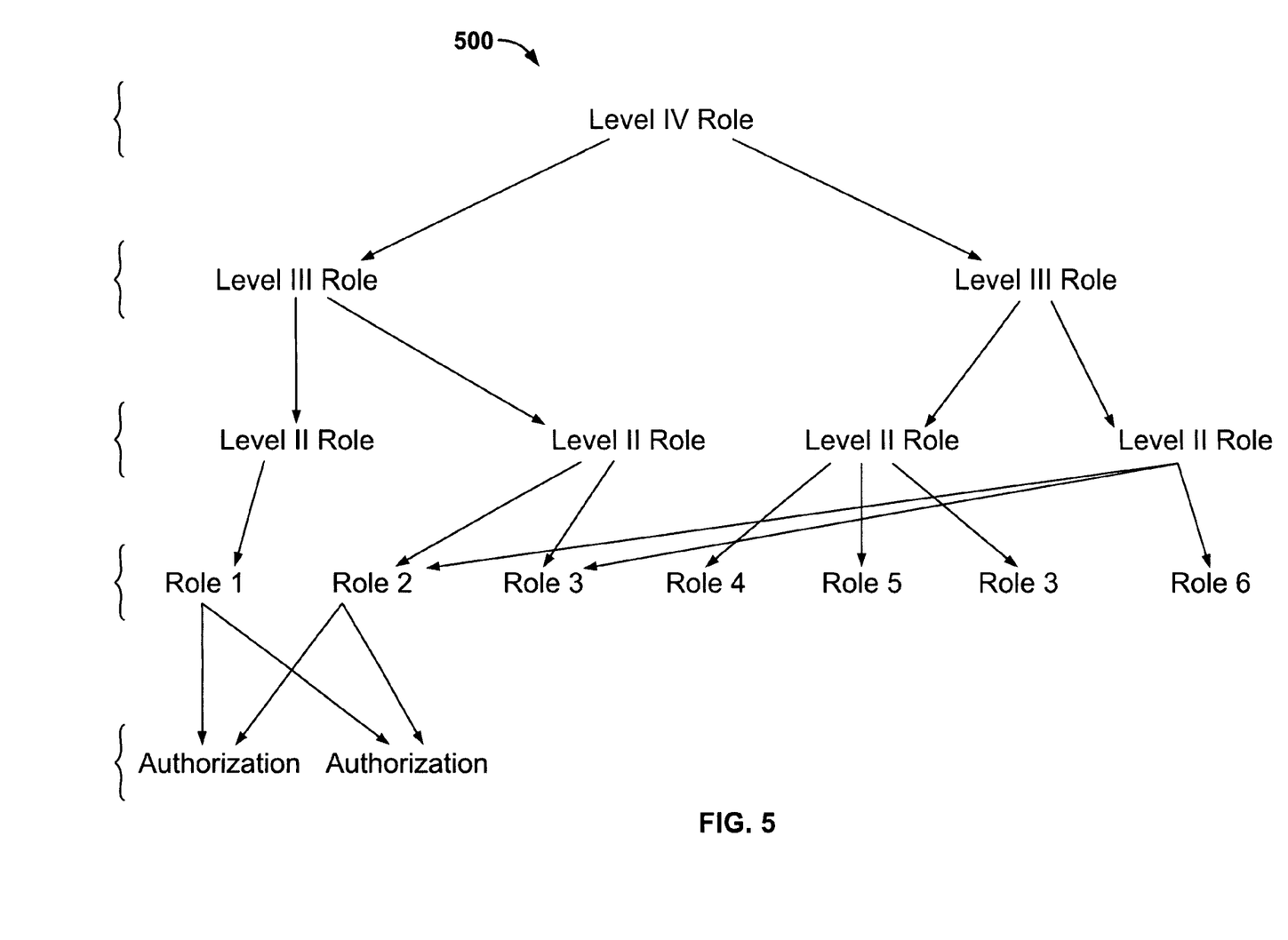
FIG. 5 schematically shows a role hierarchy.

FIG. 5 shows a role hierarchy 500 wherein authorizations or roles can be encapsulated in any number of levels. Toward the bottom of the hierarchy, the authorizations 120 are shown as being included in specific ones of the roles 118. For clarity, only two authorizations 120 are shown, and some of the roles 118 are not explicitly associated with any of the authorizations.

An authorization may be included in more than one role. The authorizations, which are considered the "Level 0" of roles, can be aggregated into one or more higher-level roles. For example, the authorizations 120 are grouped into the roles 118 which are the Level I roles. One or more of the roles 118 may be included in a Level II role 510. Each of the Level II roles collect the authorization(s) included in its Level I roles. Similarly, one or more of the Level II roles may be grouped in a Level III role 520. The Level III roles, in turn, may be grouped in a Level IV role 530. The Level IV role may collect each authorization that exists in the hierarchy 500. Accordingly, the role at any level includes every authorization of its particular subroles.

Figure 6:
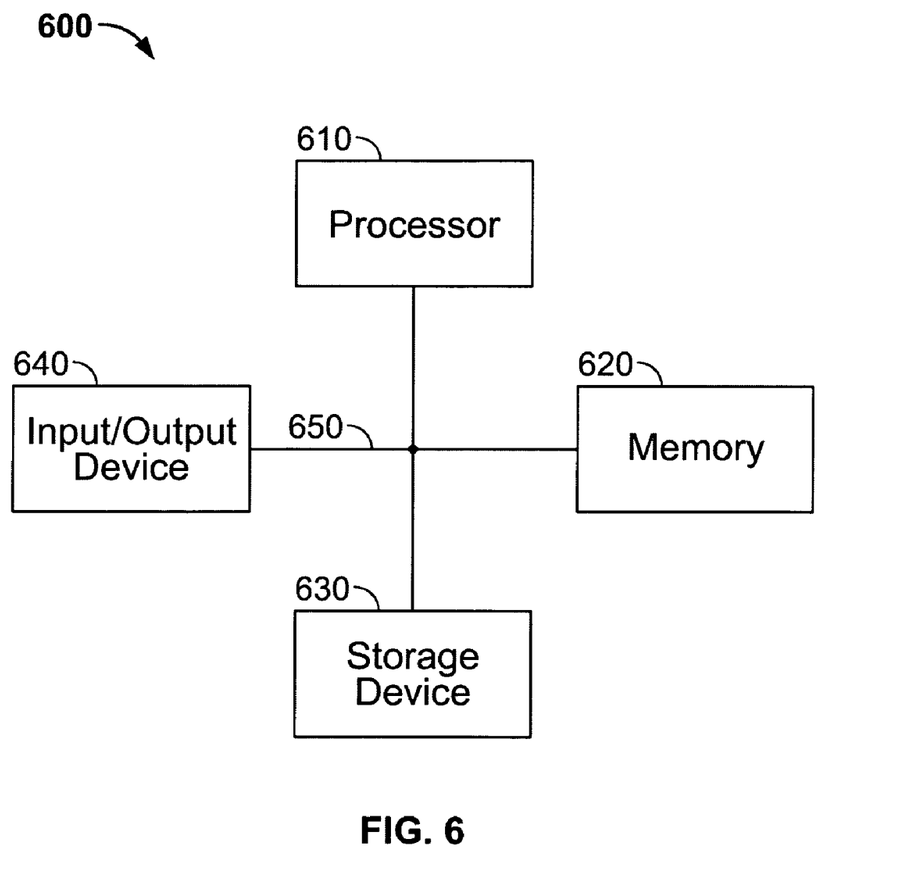
FIG. 6 is a block diagram of a general computer system.

FIG. 6 is a block diagram of a general computer system 600 that can be used in the operations described above, according to one embodiment. The system 600 includes a processor 610, a memory 620, a storage device 630 and an input/output device 640. Each of the components 610, 620, 630 and 640 are interconnected using a system bus 650. For example, each of the server device and the computer device 112 may include the components 610, 620, 630, 640 and 650.

The processor 610 is capable of processing instructions for execution within the system 600. In one embodiment, the processor 610 is a single-threaded processor. In another embodiment, the processor 610 is a multi-threaded processor. The processor 610 is capable of processing instructions stored in the memory 620 or on the storage device 630, including for receiving or sending information through the input/output device 640.

The memory 620 stores information within the system 600. In one embodiment, the memory 620 is a computer-readable medium. In one embodiment, the memory 620 is a volatile memory unit. In another embodiment, the memory 620 is a non-volatile memory unit.

The storage device 630 is capable of providing mass storage for the system 600. In one embodiment, the storage device 630 is a computer-readable medium. In various different embodiments, the storage device 630 may be a floppy disk device, a hard disk device, an optical disk device, or a tape device.

The input/output device 640 provides input/output operations for the system 600. In one embodiment, the input/output device 640 includes a keyboard and/or pointing device. In one embodiment, the input/output device 640 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of managing user access to data, the method being implemented using one or more data processors and comprising:

detecting, by at least one of the data processors, that a user seeks access to a data portion within a data hierarchy that belongs to two or more specified categories, each category requiring different authorization in order to access the data portion, at least one of the categories pertaining to a first sub-portion of the data portion and at least one of the categories pertaining to a second sub-portion of the data portion, the first sub-portion differing in scope to the second sub-portion, wherein access to the data portion requires access to both the first sub-portion and the second sub-portion;

associating, by at least one of the data processors, the user with a role;

evaluating, by at least one of the data processors, two or more authorizations based on the role associated with the user, each authorization having an authorization segment corresponding to at least one of the specified categories;

permitting, by at least one of the data processors, the sought access to the data portion if, for each specified category, there is at least one corresponding authorization segment, wherein each specified category identifies the respective data sub-portion to which access is sought; and limiting, by at least one of the data processors, access to other sub-portions of the data hierarchy by hiding information relating to the other sub-portions of the data hierarchy, when the user navigates through nodes of the data hierarchy.

2. The method of claim 1, wherein at least first and second authorizations are evaluated serially.

3. The method of claim 2, wherein the second authorization is evaluated upon determining, by at least one of the data processors, that the authorization segment in the first authorization that corresponds to the specified category does not identify the data portion.

4. The method of claim 2, wherein the data portion belongs to at least first and second categories and wherein the second authorization is evaluated, by at least one of the data processors, upon determining that the authorization segment in the first authorization that corresponds to the first category identifies the data portion.

5. The method of claim 1, wherein evaluating one or more authorizations comprises evaluating, by at least one of the data processors, a first authorization wherein the authorization segment corresponding to the specified category identifies a different data portion and evaluating, by at least one of the data processors, a second authorization wherein the authorization segment corresponding to the specified category identifies the data portion.

6. The method of claim 5, wherein the first and second authorizations have different validities.

7. The method of claim 1, wherein at least one of the authorizations has multiple authorization segments.

8. The method of claim 7, wherein some of the multiple authorization segments correspond to data dimensions.

9. The method of claim 7, wherein at least one of the multiple authorization segments correspond to a meta dimension that does not directly correspond to a data dimension.

10. The method of claim 9, wherein the meta dimension corresponds to authorizing the user to access a data source.

11. The method of claim 9, wherein the meta dimension corresponds to authorizing the user to perform an action.

12. The method of claim 11, wherein the authorized action is at least one selected from the group consisting of: a display action, a change action, an update action, a read action, a write action, a revise action, and combinations thereof.

13. The method of claim 1, wherein at least one authorization segment includes a value that is selected from the group comprising: an interval, a single value, a pattern, a variable, a hierarchy, and combinations thereof.

14. The method of claim 13, wherein the value is the hierarchy, further comprising protecting a hierarchy structure upon permitting access to the data portion.

15. The method of claim 1, wherein the specified category is a measure dimension.

16. The method of claim 15, wherein the data portion is at least one selected from the group consisting of: revenue, discount, net revenue, production costs, and combinations thereof.

17. The method of claim 1, wherein at least one authorization segment specifies a validity of the authorization.

18. The method of claim 17, wherein the validity comprises a periodically granted access permission.

19. The method of claim 1, wherein the role includes at least one authorization for the user.

20. The method of claim 19, wherein the role is included in a higher level role.

21. The method of claim 20, wherein several roles are included in the higher level role, and wherein the higher level role includes authorizations included in the several roles.

22. An article comprising a tangible machine-readable storage medium embodying instructions that when executed cause one or more data processors to perform operations comprising:

detecting that a user seeks access to a data portion that belongs to two or more specified categories, each category requiring different authorization in order to access the data portion, at least one of the categories pertaining to a first sub-portion of the data portion and at least one of the categories pertaining to a second sub-portion of the data portion, the first sub-portion differing in scope to the second sub-portion, wherein access to the data portion requires access to both the first sub-portion and the second sub-portion;

associating the user with a role;

evaluating two or more authorizations based on the role associated with the user, each authorization having an authorization segment corresponding to at least one of the specified categories; and permitting the sought access to the data portion if, for each specified category, there is at least one corresponding authorization segment, wherein each specified category identifies the respective data sub-portion to which access is sought, the data portion comprising disjunctive parts of a data hierarchy, wherein information about where the disjunctive parts of the data hierarchy belong are hidden when the user navigates the data hierarchy.

23. A method of managing user access to data, the method being implemented using one or more data processors and comprising:

detecting, by at least one of the data processors, that a user seeks access to a data portion that belongs to at least first and second specified categories, each category requiring different authorization in order to access the data portion, at least one of the categories pertaining to a first sub-portion of the data portion and at least one of the categories pertaining to a second sub-portion of the data portion, the first sub-portion differing in scope to the second sub-portion, wherein access to the data portion requires access to both the first sub-portion and the second sub-portion;

evaluating, by at least one of the data processors, one or more authorizations based on a role of the user, each authorization having at least one authorization segment corresponding to one of the first and second specified categories; and permitting, by at least one of the data processors, the sought access to the data portion if the at least one authorization segment in the one or more authorizations 1) correspond to the first and second specified categories and 2) identify the first and second sub-portions to which access is sought, the data portion comprising disjunctive parts of a data hierarchy, wherein information about where the disjunctive parts of the data hierarchy belong are hidden when the user navigates the data hierarchy.

24. The method of claim 23, wherein the sought access to the data portion is permitted upon determining, by at least one of the data processors, that the data portion is identified by the authorization segment corresponding to the first category in a first authorization and that the data portion is identified by the authorization segment corresponding to the second category in a second authorization.

25. The method of claim 24, wherein the sought access to the data portion is permitted upon determining, by at least one of the data processors, that the data portion is identified, in a first authorization, by the authorization segment corresponding to the first category and by the authorization segment corresponding to the second category.

26. An article comprising a tangible machine-readable storage medium embodying instructions that when executed cause one or more data processors to perform operations comprising:

detect that a user seeks access to a data portion that belongs to at least first and second specified categories, each category requiring different authorization in order to access the data portion, at least one of the categories pertaining to a first sub-portion of the data portion and at least one of the categories pertaining to a second sub-portion of the data portion, the first sub-portion differing in scope to the second sub-portion, wherein access to the data portion requires access to both the first sub-portion and the second sub-portion;

evaluate one or more authorizations based on a role associated with the user, each authorization having at least one authorization segment corresponding to one of the first and second specified categories, the at least one authorization segment defining a range of authorized values; and     permit the sought access to the data portion if the ranges defined by the at least one authorization segments in the one or more authorizations 1) correspond to the first and second specified categories and 2) identify the first and second sub-portions to which access is sought, the data portion comprising disjunctive parts of a data hierarchy, wherein information about where the disjunctive parts of the data hierarchy belong are hidden when the user navigates nodes associated with the data hierarchy.

\* \* \* \* \*